US006276883B1

United States Patent
Unsworth et al.

(10) Patent No.: US 6,276,883 B1
(45) Date of Patent: Aug. 21, 2001

(54) SELF ADJUSTING SCREW SYSTEM

(76) Inventors: John Unsworth, 365 Lodor St., Acaster (CA), L9G225; Thomas Waram, 1063 King St. West Suite 204, Hamilton (CA), L8S51L8

(*) Notice: Subject to any disclaimer, the term of this patent is extended or adjusted under 35 U.S.C. 154(b) by 0 days.

(21) Appl. No.: 09/541,508

(22) Filed: Apr. 3, 2000

(51) Int. Cl.⁷ ............... F16B 35/02; F16B 37/12; F16B 39/284
(52) U.S. Cl. ............... 411/324; 411/16; 411/383; 411/438; 411/909; 411/916
(58) Field of Search ............... 411/16, 17, 18, 411/438, 916, 917, 909, 324, 383

(56) References Cited

U.S. PATENT DOCUMENTS

| | | | |
|---|---|---|---|
| 1,468,074 | * 9/1923 | Peirce | 411/16 |
| 3,515,027 | * 6/1970 | Textrom | 411/438 |
| 4,040,326 | * 8/1977 | Breed | 411/438 X |

FOREIGN PATENT DOCUMENTS

276713 * 3/1990 (DE) ..................... 411/17

* cited by examiner

*Primary Examiner*—Neill Wilson (57) ABSTRACT

A fastener system includes a screw or bolt which can be attached in a helicoil. The helicoil expands and torques by various means to maintain hold and purchase between the screw coil combination and the substrate into which the screw and helicoil are inserted even when the substrate recedes a significant distance from the screw and helicoil combination.

44 Claims, 7 Drawing Sheets

SELF ADJUSTING SCREW SYSTEM

FIELD OF THE INVENTION

The field of the invention is mechanical fasteners mainly for orthopedic use and for high vibration environments.

BACKGROUND AND SUMMARY OF THE INVENTION

Screws are used to hold together various materials and generally depend upon wedging the threads and shaft of the screw into the substrate into which the screw is driven for a secure connection. However, this wedging action applies forces and resulting stresses on substrate that in certain circumstances speed substrate degradation at or adjacent to the screw and substrate interface and this in turn may lead to the loosening of the screw.

An example of this effect occurs in orthopedic screws that are driven into bones. These screws can damage the bone cells at and near the bone and screw interface, causing the bone to slowly recede from the screw and eventually causing the screw to loosen.

Another example occurs in wood where the wedging forces crushes the wood adjacent to the wood and screw interface. Also stone and concrete often crack due to the wedging forces of normal screws and bolts, especially where they are located near edges. In metal fabrication where the wedging action of a screw being driven into a metal substrate can alter the metallurgy of the substrate immediately adjacent to the screw and substrate interface. This metallurgical alteration can in certain circumstances speed corrosion and lead eventually to fastener failure.

In many cases there is a very limited elastic range in the substrate into which the screw is driven. Any recession of the substrate from the original substrate and screw interface will result in a dramatic reduction in the wedging force that the screw depends upon for purchase and hold, since the reaction forces exerted by the rigid substrate fall off rapidly with substrate recession.

One method presently used to increase the holding power of the screw is to attach a spring washer beneath the head of the screw that increases the friction and wedging forces between the thread of the screw and the substrate into which the screw is driven. The difficulty with this approach is that the spring washer pulls the screw out of the lumen into which it is driven rather than pushing it in. If the screw does become loose for any reason, this pulling force may act to accelerate the further loosing of the screw. A further difficulty with this method is that it often exerts uneven pressure on different parts of thread of the screw. This uneven application of pressure can result in lower overall friction available to keep the screw secure in the substrate and also increase in some cases the damage to the substrate that in turn may cause further loosing.

What is needed is a screw system that does not depend principally upon the wedging forces to maintain its purchase and hold in the substrate.

What is also needed is a screw system that tends to push the screw into the substrate into which it is driven rather than pull it out.

What is also needed is a screw system that evenly distributes the frictional forces along the interface between the screw and the threat on which it slides.

The present invention is a screw system that maintains purchase and hold in the substrate by maintaining a relatively low and constant force normal to the longitudinal axis of the screw even if and as the substrate recedes away from the screw and substrate interface. This force normal to the said longitudinal axis of the screw can be kept relatively constant and can be established in advance for various specific purposes to prevent unnecessary damage to the substrate into which it is inserted. Also the screw system expands as the substrate recedes maintaining intimate contact between the two. Additionally the screw system may apply a controlled and relatively constant force parallel to the longitudinal axis of the screw, pushing the screw into the hole into which it is driven and increasing the friction between the screw and the thread into which it driven thereby reducing the chance of the screw turning back out the hole.

A preferred embodiment of the invention is a system comprised of a screw and a coil or helicoil (the terms having the same meaning in this patent). Both the screw and the coil are inserted into the substrate. The helicoil is a coil formed usually from metal wire, but can be formed from any material that can have springiness imparted to it, including plastic and biodegradable plastic. The screw threads into the center of the coil, the turns of which, on the interior surface, describe the thread that meshes with the threads of the screw. The outside of the coil also forms a thread which can in turn be threaded into a thread tapped or cut into the interior walls of a hole in the substrate into which the screw and coil system are driven. In the event that the walls of the hole are not prepared with a thread, the coil may still be screwed into the hole and the coil itself will press or cut threads which will mesh with those threads (formed by the turns of the coil) on the outside of the coil.

This combination of screw and coil are well known to the art. U.S. Pat. No. 4,712,955 by Reece et al. describes a screw and helicoil system where the screw is larger than the helicoil and forces the helicoil out normal to the longitudinal axis of the coil and screw, utilizing ramp-like threads on the screw and receivers on the inside of the coil. This action creates very strong wedging forces that hold the screw and coil assembly in the hole of the substrate. This method while suitable for some purposes is not suitable where the substrate is likely to recede away from the original interface between the coil and the substrate. As explained above, even thought the wedging forces are very high, they are maintained over a small distance normal to the longitudinal axis of the coil and screw, and drop off dramatically when the substrate recedes away from the said interface.

The preferred embodiment of the invention includes a coil and screw system, but the coil, by various means tends to expand once it is inserted into a substrate independently, and not by being forced to do so by another element of the attachment system. These means are referred to herein as "expansion means". While expansion is desirable, it must not be at the expense of the loosing of the screw from the substrate as the coil moves away from the screw in response to the coil following the recession of the substrate. This patent provides those means to ensure that the connection between screw and coil is maintained under these conditions.

Unlike the wedging action of the conventional screw or conventional screw and coil combination, the coil will expand radially a relatively large distance following any recession of the substrate away from the original substrate coil interface and especially if superlastic shape memory alloy (SMA) material is used for the coil the forces exerted by the expanding coil on the interfacing substrate into which the screw and coil are driven will be relatively even, predictable and repeatable. The expanding screw and coil combination will also by various means described below maintain the purchase and hold of the screw and coil combination on the lumen of the substrate into which the said combination are driven.

A preferred embodiment of the invention includes means that tend to increase the friction between the coil and the screw and at the same time draw the screw further into the lumen of the substrate into which the screw and coil are inserted. These means are referred to herein as "torquing means" and "corrugating means".

Preferred embodiments of the invention may incorporate either those features that tend to expand the coil, once in the substrate; or those features that tend to increase friction between the coil and the screw and draw the screw into the said lumen; or both.

Expansion means both involve wrapping the coil around the screw and then introducing new conditions that allow it to expand. The first such means is to start with a coil, having springiness, that in its unloaded state has a lumen diameter larger than the outside diameter of the screw around which it will be threaded. When the coil is tightly wound around the screw, the turns of the coil falling between the threads of the screw so that they mesh, the coil will assume a more compact diameter, and if restrained by some means in this compact form will expand when the restraining means are later removed. The springy material would include conventional spring metal plastic or superlastic material, the latter of which is shape memory alloy (SMA) material that is above its austenite finish temperature in both its compressed and expanded form.

The second means to effect the expansion of this coil is to use a coil that is made of shape memory alloy (SMA) material that has been shaped set at high temperature to form a coil that has a lumen diameter larger than the outside diameter of the screw around which it will be wound. When the coil is cooled below its martensitic finish temperature, that is it is pliable, it is wound tightly around the outside diameter of the screw, the turns of the coils falling between the threads of the screw so that they mesh. The coil will then assume a more compact diameter than it's heat set size before cooling. When the coil is then heated to a temperature equal to or above its austenite finish temperature the high temperature or larger diameter shape will be recovered and the coil will expand.

Torquing means can similarly by imparted into the coil. Torquing occurs where twist is imparted to the wire along the longitudinal wire axis that forms the coil, or in the case of a coil fabricated from a tube, where twist is imparted to the tubular member that forms the coil, along its longitudinal tube axis. Torquing can occur by simply compressing or pulling the coil spring along the longitudinal axis of the gross coil (as distinguished from the longitudinal axis of the member forming the coil). Torquing may also occur in a more direct manner by grasping and twisting part or parts of the coil spring along the axis that runs longitudinally through the wire or tubular member that forms the coil. This special way of imposing torque on the spring is referred to in this patent as "tilting".

For example, the coil may be made of a wire with a rectangular cross-section, rather than the customary round one, the short sides forming the outside and inside surfaces of the coil and the long sides forming the facing surfaces between the turns of the coil. Such a coil would look like a Slinky-Toy™. These turns, of the Slinky-Toy for example, are flat having the longitudinal axis of their rectangular cross-sections approximately normal to the longitudinal axis of the gross coil. Now if the said cross-sections of these turns, unlike a Slinky-Toy™, were angled in their unloaded state such that their longitudinal axes formed a 45 degree angle with respect to the plane passing normal through the longitudinal axis of the gross coil, each turn of the coil (if it consisted of a solid loop) would form a coned-disk shape. This shape not coincidentally would be similar to that of a belleville washer. If the coil was made of springy material, each turn of the coil would act like a belleville washer if force was applied to move the turns, or tilt their cross-sections from their unloaded angled, coned-disk configuration to their loaded flat configuration (or some configuration having a different angle than the unloaded configuration). Any coil can be tilted, but most convenient are those with cross-sections that provide points of purchase such as a rectangle, diamond, cam or triangle.

Tilting (the special way of applying torque as described above) means can similar to expanding means be effected by two physically related routes. The first route is to tilt coil turns of a springy material as described in the immediately preceding paragraph and then detachably attach the turns of the coil along all or part of its surface of the screw, such that when the constraints of the attachment are removed, the turns of the coil so treated will unload and spring back tending to project the screw further into the substrate into which it is driven by reacting against the threads of the lumen of the substrate on one hand, and on the threads of the screw on the other. The springy material that comprises the coil can include conventional spring metal, plastic or superlastic material, the latter of which is shape memory alloy (SMA) material that is above its austenite finish temperature in both its compressed and expanded form.

The second route is to make the coils from shape memory alloy (SMA) material and impart at high temperature, typically in the range of 400–500° C., for nitinol SMA for example, a cross-sectional shape, that will be recovered after the coil is cooled to a temperature equal to or below the martensite finish temperature and then heated to a temperature equal to or above its austenite finish temperature. The shape so imparted will be such that when it is constrained below the martensitic start temperature and then subsequently heated to or above the austenitic finish temperature it will have tilt imparted into the turns of the coil. Since the SMA material has been heated to or above the austenite finish temperature it will be superlastic and be springy and therefore be able to spring back and as in the preceding example tending to push the screw on which it is turned forward into the substrate. If the high temperature cross-sectional shape is the same as the previous example, that is, the longitudinal axis of the coil cross-section in its unloaded state is angled 45 degrees with respect to the plane passing normal through the longitudinal axis of the gross coil, and while below the martensitic finish temperature is flattened so that the same longitudinal axis of the coil cross-section is parallel to the plane passing normal through the longitudinal axis of the gross coil; and if the coil is then constrained to maintain the said flattened cross-section, when the coil is heated to or above its austenite finish temperature it will become tilted. Once tilted the coil being now superlastic and springy may spring back and as in the previous example tend to push the screw forward into the substrate.

The turns of the coil can also be corrugated rather than tilted. The coil would meander back and forth so that the ribs of the corrugations would begin at the inside lumen of the coil and radiate or proceed out to the outside surface of the coil, usually normal to the longitudinal axis of the coil, but other angles or curves could be used in some preferred embodiments as described in the detailed description of the drawings below. This type of treatment would in some preferred embodiments of the invention be applied to the Slinky-Toy™ type of coil, that is one with an approximate square or rectangular cross-section. This treatment could be in addition to or instead of the tilting means elsewhere referred to herein. The means for accomplishing this would be similar to those used to effect the expanding means above. The corrugated coil could be made of springy material and in its unloaded condition could be flattened and restrained by detachable attachment on to the screw. When unloaded the coil would unload into its corrugated form and spring back tending to project the screw further into the hole into which it is driven by reacting against the threads of the lumen of the substrate on one hand, and on the threads of the screw on the other. This springy material would include conventional spring metal plastic or superlastic material, the latter of which is shape memory alloy (SMA) material that is at or above its authentic finish temperature in both its compressed and expanded form. Similarly the material could be made of shape memory metal (SMA) material, this method making use of the shape recovery regime. The recovered shape could be corrugated. The corrugated coil could be flattened into its uncorrugated form at a temperature equal to or below the martensite finish temperature and attached to the screw. When heated to or above its austenitic finish temperature and constrained into its flattened shape, the corrugated shape would be recovered, loaded and be superlastic and when no longer constrained would spring back tending to project the screw further into the hole into which it is driven by reacting against the threads of the lumen of the substrate on one hand, and the threads of the screw on the other. Rather than corrugate the coil, The coil could of course be a hollow tube and can have a compact and expanded form effect by the same means as the corrugated coil for the same purpose of providing spring-back to move the screw further into the substrate and increasing the frictional forces maintaining the screw in position.

Finally, tilting means can be additionally applied to any or any combination of methods above noted by turning the screw inside the coil while the turns of the coil are constrained by the threads of the substrate into which the screw and coil are inserted and the forward progress of the screw is stopped by the head of the screw abutting the said substrate or the tip of the screw striking a part of the substrate that prevents the screw from advancing any further. When this occurs, the threads of the screw will tend to pull the inside of the coil, to which it interfaces, in a direction opposite to the direction the screw is driven into the hole in the substrate. When the screw is turned no more, and if the said coil is made of spring material the spring-back of the said coil will tend to project the screw further into the hole into which it is driven by reacting against the threads of the lumen of the substrate on one hand, and the threads of the screw on the other.

As the coil expands, it also unwinds, and therefore if a very long threaded section is required, it is preferable that a series of small coils be placed end to end to make up the long section desired. This will reduce the friction at the coil and substrate interface which might otherwise prevent the coil from unwinding and expanding. These small coils may be separate or detachably attached so that they separate once placed inside the lumen of the said hole in the substrate. The easiest means of making the coils detachably attach is to introduce a crack or groove at intervals along the length of the wire forming the coil, such that separation will occur when the screw is turned sufficiently causing twisting forces to be imparted to the coil.

While the coil, tang or tangless, can be inserted into the substrate using helicoil insertion devices well known to the art, the preferred embodiment loads the coil onto the screw prior to insertion into the substrate as assumed above. If the coil is inserted into the substrate using an insertion tool, it will obviously require means to detachably attach the coil similar to those utilized in the screw and coil combination described in more detail herein, therefore a preferred embodiment of this invention would include an insertion tool that would have those same features as the screw and coil combination described herein.

These restraining means referred to in this patent require in most cases a detachable attachment at one or more places along the interface between the coil and the screw that and are well known to the art and include a pressure fit, pressure welding, tack welding, adhesives, flexible adhesives and biodegradable adhesives as well as water solvent adhesives the last of which would be of particular use for orthopedics and for wood work. Plastic clips or a plastic sheath can also be used that might be biodegradable or simply peal back, split or be deformed as the coil and screw are driven into the substrate. The preferred embodiment provides means for breaking the detachable attachment when the screw imparts sufficient twisting forces onto the coil as the screw is finally tightened and the coil is distorted by the action of the screw. The tacking materials could also be biodegradable and dissolve over time in the presence of solvents such as water, or corrode by biochemical or electrochemical action. Adhesive materials or mechanical attachments between the coil and the screw will be weaker transverse to the axis of the coil wire or tube, rather than parallel to it, since the coil will more easily roll in the transverse direction in response to torquing forces, than in the parallel direction where bending forces of the coil are required. This allows for the coil to be pulled into the substrate with a relatively weak bond between the coil and the screw, but once in the substrate, only a relatively little torquing action, that causes the coil to roll on the screw, is required to break the bond.

In the case of orthopedic use the use of a coil and screw combination permits greater ease of removal of the screw without damaging the bone tissue. The screw can be turned out and the threads will slide along the turns of the coil, rather than scraping along the bone. The coil can be pulled out using helicoil removal devices well known to the art, but in most cases will be left in the bone as the coil is small and is soon engulfed by the growing bone. A preferred embodiment of the invention includes coating the outside surface of the coil to encourage bone attachment by means well known to the art, including attaching porous materials to the outside surface of the coil or treating the outside surface of the coil material so that it is more porous by acid etching or other means well known to the art. Bone attachment to the outside of the coil will retard bone recession from the attachment. The application of bone attachment materials to a simple screw is not practical as removal of the screw after bone attachment to the screw surface would severely damage the bone tissue. These features noted above allowing easy removal of the screw also would apply to all other uses.

For orthopedic use, if the coil is made from superlastic shape memory alloy (SMA) material, the system that is the subject of this invention has the additional advantage that it applies the connecting forces with relatively constant forces over significant distances even as the relative positions of the attachment system and the bones change by bone recession and growth. This feature also applies to all other uses.

Figure 22:
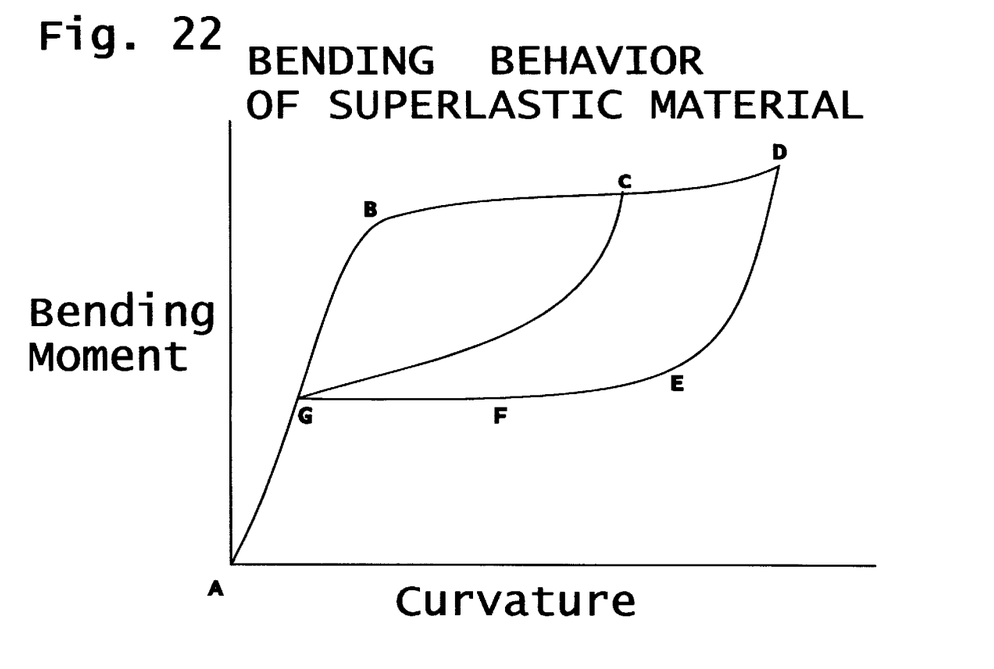
FIG. 22 is a graph illustrating bending moment behavior as a function of the curvature of a bending member.

The even and predicable forces exerted by a coil made of superelastic material, for example superelastic nitinol alloy, on the substrate are primarily due to the relatively consistent unloading bending forces exerted by the turns of the coil as radial forces on the substrate, as the "wound up" and constrained coil is released or sprung back after or during installation of the screw/coil assembly. All or some of the turns of a superelastic coil are preloaded primarily in bending prior to installation of screw-coil assembly, by the application of a bending moment, such that the curvature of each preloaded turn is increased relative to the curvature of the turn in the unloaded state, in which no bending moment is applied. A possible loading path during the preloading of a turn of a superelastic coil, is path ABD FIG. 22, although numerous other loading paths exist whereby loading can occur to a point between B and D, for example C. During or after installation of the screw/coil assembly, the preloaded turns will unload, thereby undergoing radial expansion, in response to substrate recession or a reduction in substrate stiffness. This unloading can occur in a number of possible ways. One possible unloading path is path DEG FIG. 22, although numerous other unloading paths to any point beyond D along path DEFGA could be taken, for example, unloading to a point F, between E and G. In the case where preloading was done to a point between B and D on FIG. 22, unloading can occur to any point along numerous sub-pathways, one such example being CGA It is also possible to facilitate partial unloading of the superelastic coil turns following preloading and prior to installation of the screw/coil assembly in the substrate lumen.

Similarly, the spring-back from the tilting or torquing of the coil turns will provide an even and predictable thrusting force that keeps the screw pushing into the substrate lumen, due to the superelastic loading and unloading torque-twist behavior of the coil turns in a manner similar to the superelastic bending moment-curvature behavior described above.

For orthopedic use, the coil can be designed to respond in the same manner as the bone itself to loads and shocks, thus reducing stress concentrations at the site of the repair. Where the screw system is used to hold two bones together, the strength of the tilting and the amount of expansion of the coil can be set for the optimum pressure required to hold the two bones together to promote bone growth and mending. This feature also applies to all other uses.

The system that is the subject of this patent is particularly well suited to environments that have large swings in temperature or where vibration is present. Space structures that have huge temperature swings would benefit from the attachment system described herein. Engines and airframes would also be able to make use of the attachment system herein describe.

BRIEF DESCRIPTION OF THE DRAWINGS

The detailed description particularly refers to the accompanying figures in which:

FIG. 7 also illustrates the coil 1 in the fully torqued position and the spring-back 12 of the turns 2c of the coil 1 which draws 14 the screw into the lumen of the substrate 9.

DETAILED DESCRIPTION OF THE DRAWINGS

Figures 1, 2:
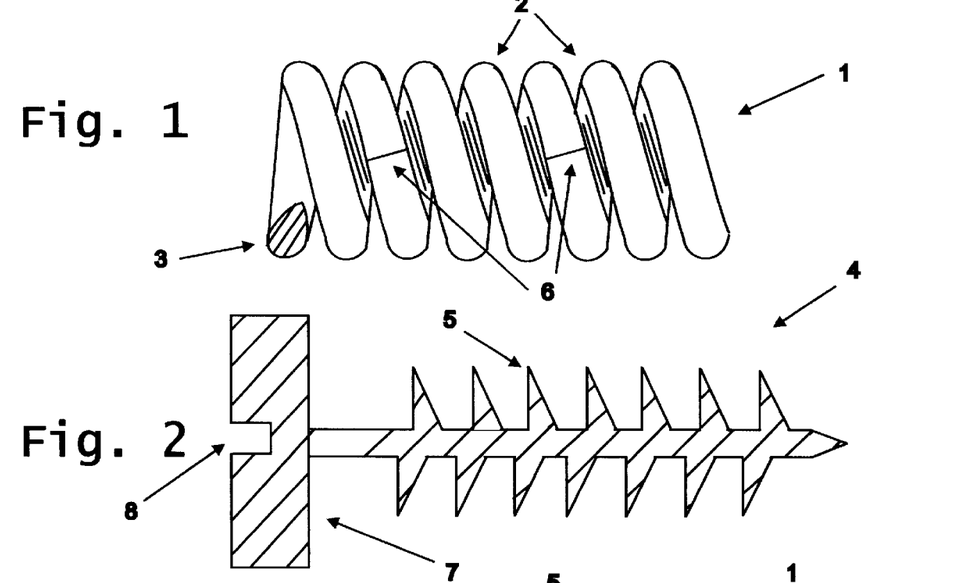
FIG. 1 is a perspective view of a coil 1.
FIG. 2 is a cross-sectional view of a screw 4.
Figures 3, 4:
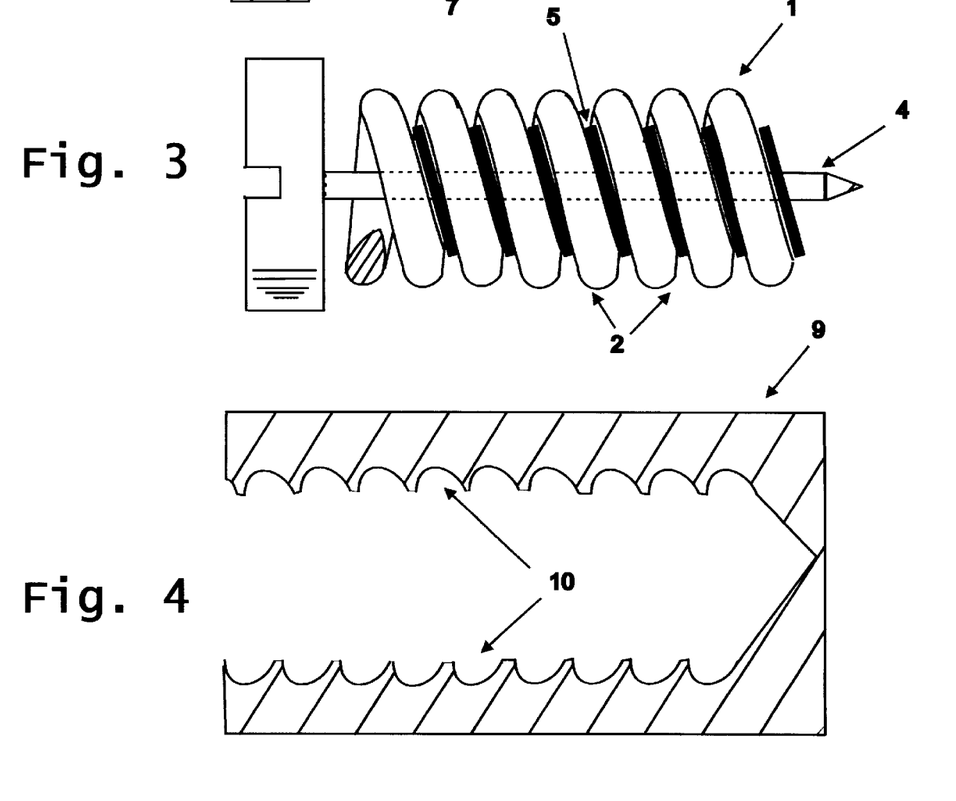
FIG. 3 is a perspective view of the said coil 1 loaded around the screw 4 with the threads 5 of the screw falling between the turns 2 of the coil.
FIG. 4 is a cross-sectional view of the substrate 9 into which has been bored a hole, and threads 10 have been cut into the walls of the hole to accommodate the coil 1 and screw 4.
Figure 5:
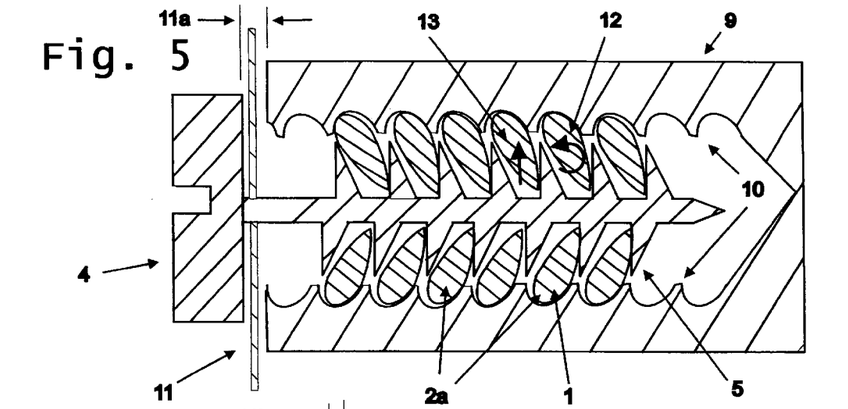
FIG. 5 is a cross-sectional view of screw 4 and coil 1 which have been threaded into a hole in the substrate 9. The screw 4 has not been fully tightened and thus the coil is in its unloaded orientation 2a. The cross-sectional shape of the coil 3 in this illustration is shaped approximately like a cam.
Figure 8:
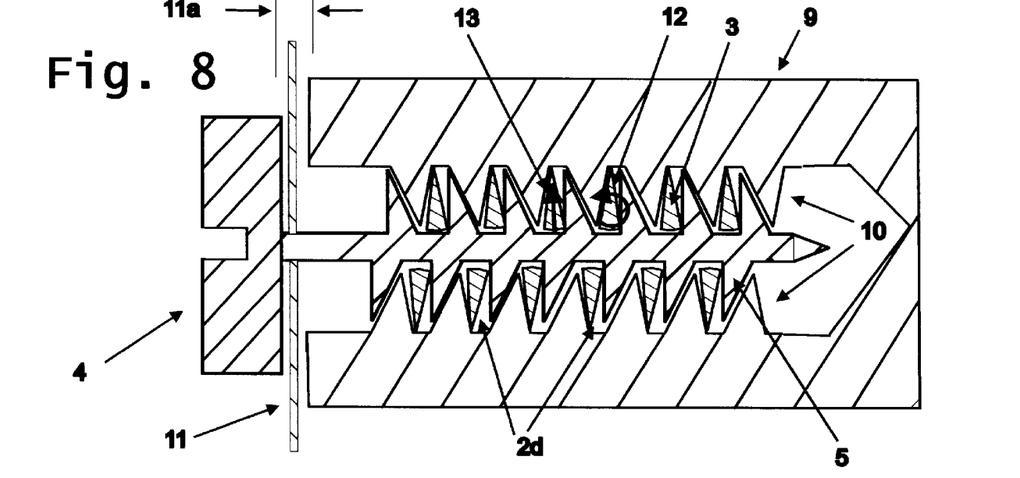
FIG. 8 is a cross-sectional view of the screw 4 and coil 1 having a different cross-sectional shape 3 being approximately triangular in shape. The screw 4 has not been fully tightened and thus the coil is in its unloaded orientation 2d. The substrate illustrated in this preferred embodiment lies in-between the threads 5 of the screw 4.

FIG. 1 illustrates a coil 1, which can have one or more turns 2 and have dimensions required by the use to which it is employed. The cross section 3 can be any shape that provides a purchase to the screw 4 illustrated on FIG. 2 and its thread 5 that is threaded into the lumen of the said coil 1, as illustrated in FIG. 3, and a purchase for the thread or surface 10 on the inside of the substrate 9 both shown on FIG. 4. The screw includes a means for turning it 8, in this case a slot in the head of the screw 4. The cross-section can include such shapes as a cam, as shown on FIG. 1, an approximate triangle as shown on FIG. 8, a diamond, a rectangle as illustrated on FIG. 14 or any other shape that will provide the said necessary purchase to substrate 9 and screw 4. The shape of cross-section 3 will depend largely on the mechanical properties of the substrate and in particular its strength and tendency to recede with time from away from the original interface between the coil and the substrate 9. Likewise the cross-sectional shape of the screw 4 and screw threads 5, can be of any shape to properly mate with the coil 1 and to allow for the coil to expand and control the position of the coils with respect to the screw 4 and the substrate 9. For some preferred embodiments of the invention the threads 10 of the substrate 9 can extend between the threads 5 of the screw 4 as illustrated in FIG. 8 while in other preferred embodiments they can be outside the said threads of the screw 4 as illustrated in FIG. 5.

The substrate 9 can be of any material into which the screw and coil system can be inserted. This would include bone or cartilage for orthopedic uses and metal and plastic and wood for structural or ornamental uses.

The system can include a number of coils, rather than just one, located end to end. These can be abutting or can be spaced, depending upon the circumstances. FIG. 1 illustrates a coil that is detachable attached and detaches to form in this example three separate coils. Grooves 6 fabricated into and running around the outer surface of the coil 1 approximately transversely to the longitudinal wire axis of the coil, create lines of weakness that allow the coil to separate when it is twisted or torqued, once placed inside the substrate 9. This twisting or torquing can occur when the screw is tightened into place, but can also take place later when the coil begins to expand or release its torquing action when the substrate begins to recede away from the original interface between coil and substrate. This separation of the coil allows for the coil to unwind along its longitudinal axis as it expands in the substrate without excessive frictional resistance between the surface of the coil and the mating surface 10 of the interface 9. These means of detachably attaching coils, in the event multiple coils are used, is merely illustrative and other methods of detachably attaching the coils is well known to the art, such as the use of adhesives or spot welds, to name two.

The means of attachment of the coil 1 onto the screw 4 will be explained in greater detail below, however in order to allow for the screw and coil to be turned together into the substrate, it will be necessary to at least fix the distal end of the coil to the distal end of the screw and such attachment may be detachably attachable. The said detachable attachment can be by use of adhesives, biodegradable adhesives, welds or mechanical connections such as hooks or press fit mortise and tendon or such other means well known to the art. Once in place inside the substrate, the means of attachment, except for perhaps the distal end of the screw and coil, should be detachable so that the coil is free to expand with the receding interface between the coil 1 and substrate 9. This detachment can occur, for example, due to the torquing action imparted on the coil by the tightening of the screw, or by biological degradation of the adhesive bond mentioned above.

FIG. 5 illustrates the cross section of the turns 2a of the coil 1 and the screw 4 which have both been inserted into the substrate 9. The head of the screw 4 has not yet contacted the substrate 9 and is separated by approximately the distance 11a. At this point the coil is still maintained in its small diameter form by some means. If the coil is made of shape memory alloy (SMA) material, this depicts the situation just prior to the shape recovery while the coil is still below its austenitic start temperature and shape recovery has not begun which will cause the coil to attempt to expand against the substrate 9 and perhaps produce a torquing or tilting action in a direction opposite to 12 which when allowed to spring back will act to push the screw threads 5 further into the lumen of the substrate 9. It is to be understood that this illustration is idealized for the purposes of clarity and shape recovery might in certain circumstances have begun at this point. If the preferred embodiment does not depend upon shape recovery, but on being physically radially compressed and attached to the screw prior to placement in the substrate 9, the coil at this point will be still in its small diameter configuration only because it is being physically constrained by some means. These means will be described below. As well as being constrained to a smaller diameter, the coil can also, but need not be torqued or tilted in a direction opposite to the angle of the coil turns and opposite to direction 12. If this is the case, when the physical restraints are removed, the torque applied will unwind in a direction 12 that will draw the screw further into the lumen of the substrate 9. Similarly if the turns 2 of the coil 1 are corrugated, such corrugations will spring back when they are heated above the austenitic finish temperature or if physically constrained when they are released from the physical restrains as shown on FIG. 17.

Figure 6:
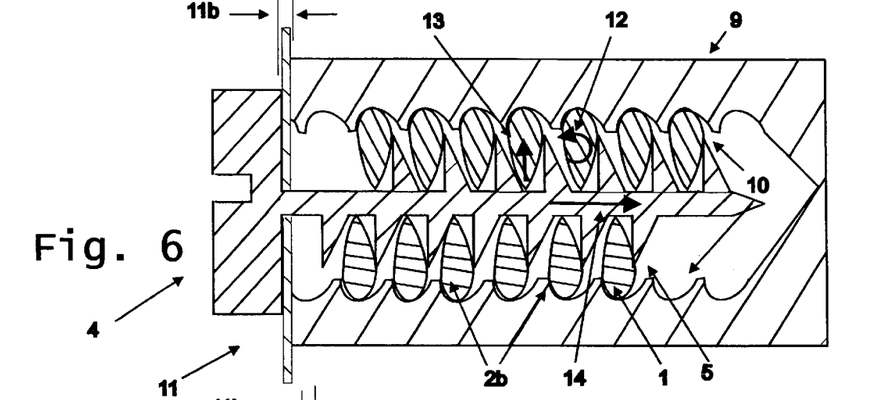
FIG. 6 is a cross-sectional view of the screw 4 and coil 1 as illustrated in FIG. 5, however the screw 4 has been turned beyond the point at which it continues to advance into the hole in the substrate and instead applies torque to the coils of the said coil.

FIG. 6 illustrates the system when after the head of the screw 4 has contacted the plate 11 and they in turn have contacted the substrate 9. After further tightening, the threads 5 of the screw 4 torque or tilt the turns of the coil in a direction opposite to the direction illustrated by arrow 12 to position 2b. (it being understood that the direction of the arrow will be the mirror image for the bottom row of cross-sections of the coil in the said illustration). The spring-back force generated by this torquing action will tend to pull the screw further into the lumen of the substrate 14, increase the frictional force between the screw and the coil and the coil and the substrate, and together help to maintain tightness of the screw and the coil in the substrate 9. This torquing or tilting action effected by the additional turns of the screw, may be in addition to the torque or tilt that was imposed on the coil prior to insertion to enhance the effect, or the shape that is recovered in the case of the shape memory metal being utilized for the coil which as described above could exert a torquing or tilting action in the same direction, for the same purpose. At this point, it is assumed that most, if not all of the coil has been released by any physical restrains maintaining its constrained shape, or in the case of the coil being made of shape memory metal (SMA) material, that the coil has heated to or above its austenitic finish temperature and shape recovery has occurred tending to expand the coil normal to its longitudinal axis 13. In both cases, the coils have sprung out and perhaps, produced the additional torquing or tilting action and consequent spring-back described above, if such feature was added prior to placement in the substrate 9. FIG. 6 also illustrates how the final turns of the screw not only apply torque or tilt to the turns 2b of the coil 1, but in doing so cause the turns of the coil to press into the substrate and establish a firm contact between the two.

Figure 7:
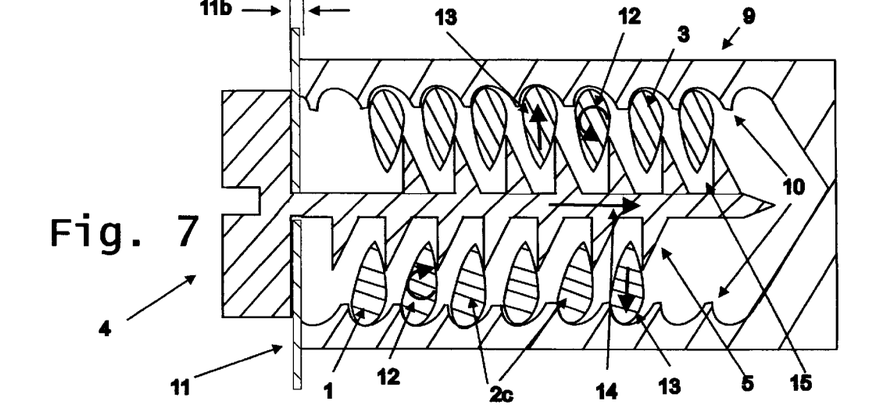
FIG. 7 is a cross-sectional view of the screw 4 and coil 1 as illustrated in FIGS. 5 and 6, however the substrate 9 has receded away from the original screw and substrate interface, and the coil, which was radially loaded expands outward to maintain contact with the threads on the inside walls of the hole in the substrate.

FIG. 7 illustrates the system when the substrate 9 has receded away from the original interface between the coil and the substrate 9 an exemplary distance 15. The coil has expanded normal 13 to its longitudinal axis, but maintained contact between the threads 5 of the screw 4 and the turns 2c of the coil 1. The shape of the cams and the distance between adjacent threads 5 of the screw 4 tend to maintain the screw in the center of the lumen of the substrate as the coil 1 expands away from the screw 4. The torque or tilting imparted into the turns of the coil as described above have begun to unwind or spring back 12 rotating the cross-sections of the coils to position 2c. This unwinding or spring-back assists in maintaining contact between the screw 4 and the coil 1, but also assists in maintaining the pressure of the turns of the coil on the substrate due to the shape of the cam. The slope of the cam, where it contacts the thread 5 of the screw 4, in combination with the unwinding of the torque or tilt imparted to the coil, act to provide a relatively gentle push to the turn of the coil in a direction normal to the longitudinal direction of the screw and thereby establish a smooth bed in the substrate for the coil to lie in. This coil smoothed interface between coil and substrate assists to even the forces impinging on the substrate and prevents pressure spots that can damage the substrate and lead to loosening of the screw. This is to be contrasted with a conventional screw and its wedging means that act directly on the substrate without the spinging action of the present embodiment and its indirect linkage between the offset cam and the coil spring.

Figure 9:
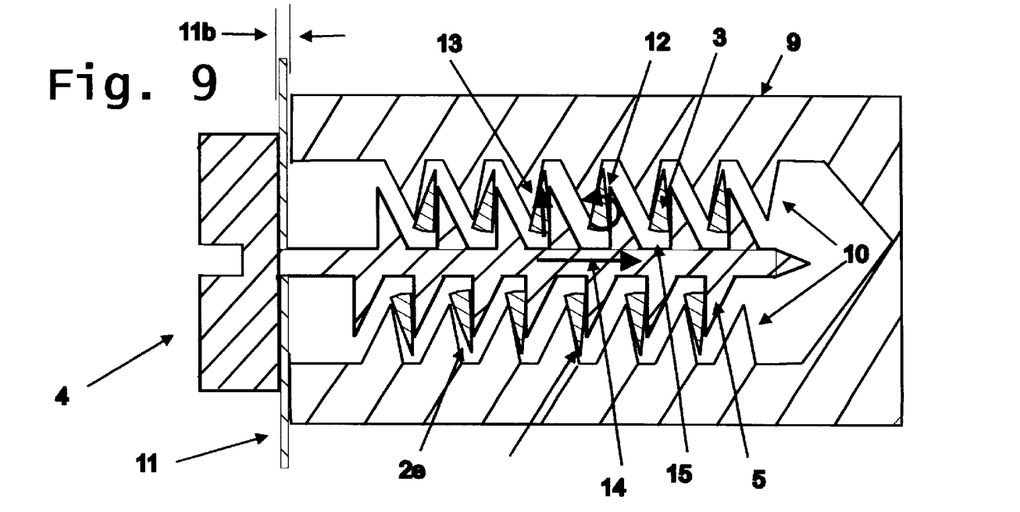
FIG. 9 is a cross-sectional view of the screw 4 and coil 1 where the substrate 9 has receded from the original substrate and screw interface 15. The coil 1 has expanded radially 13 to maintain the purchase of the screw threads 5 against the substrate threads 10. The screw 4 has been turned beyond the point at which it advances into the hole in the substrate and instead applies torque to the coils of the said coil.

FIGS. 8 and 9 illustrate a similar system to that described in FIGS. 5, 6 and 7 but instead of the coil 1 having a cam cross-section 3, it has an approximately triangular cross-section. These illustrations also illustrate another preferred embodiment of the invention where the coil is relatively smaller and when in the compacted form the coil does not extend radially beyond, or not far beyond the furthest extent of the threads 5 of the screw 4 and part of the substrate is partly between the threads 5 of the screw 4. This results in a smaller overall hole being created in the substrate by the screw and coil combination, which might in some circumstances improve substrate strength and thus overall fastening strength. It should be noted that this arrangement is not limited to the approximately triangular cross-section of the coil, but could be applied to may other cross-sectional shapes, including a cam and rectangle. The system illustrated in FIGS. 8 and 9 would operate similarly to that described in FIGS. 5, 6 and 7, but the approximately triangular shape has the advantage of being able to wedge itself between the threads of the screw and the threads 10 of the substrate 9 as the coil expands in response to the receding substrate as indicated in FIG. 9. This action should distribute the forces exerted by the expanding coil more efficiently and evenly on the unevenly receding substrate. The same unwinding or spring-back of the torque or tilt imparted on the turns of the coil result in turning motion 12 that acts to advance the screw 4 further 14 into the lumen of the substrate 9. The wedge shape of the cross-section of the coil 1 also assists in centering the screw 4 in the lumen of the substrate 9.

FIG. 8 illustrates the system prior to the final turns of the screw 4 that will cause the distance 11a to close to distance 11b in FIG. 9. At this point the turns of the coil have the potential to expand in the direction 13 and perhaps to unwind or spring-back in direction 12 as described for FIG. 5 above when the conditions that maintained the coil in its compacted form are removed.

FIG. 9 illustrates the system when the spring coil has been released from its constraints or has been heated to or above the austenitic finish temperature and has recovered its larger diameter or tilted shape or both. The final turns of the screw 4 have also loaded additional torque or tilt to the turns that will unwind or spring-back in direction 12. FIG. 9 also illustrates when the substrate 9 has receded from the original interface between the coil and the said substrate, the approximately triangular cross-sections of the turns 2d of the coil 1 have followed the receding substrate and maintained purchase of the threads of the screw with the coil and in turn the coil with the threads 10 of the substrate.

It should be noted that various sections, segments, or areas of the coil, no matter what their cross-section, due to their flexibility, act somewhat independently, and therefore uneven recession by the substrate 9 can be accommodated by the coil 1 as the coil follows the threads 10 of the substrate 9 in recession.

FIGS. 10, 11, 12, 13, 14, 15, 16 and 17 all illustrate means of mechanical attachment of the turns 2 of the coil 1 to the screw 4 to three possible cross-sectional shapes for the turns 2 of the coil 1. These means of attachment are necessary to allow the screw 4 and coil 1 to be advanced together into the substrate 9 without separating, and also in the case of the coils that rely on spring alone, as distinguished from the shape recovery using shape memory alloy (SMA) material, to constrain the coils in the more compact form until they are in the substrate 9 and ready for deployment.

The attachment at the distal tip of the screw 4 and the distal end of the coil 1 will be in most preferred embodiments detachably attachable. This connection will be important in screwing the assembly into the substrate 9, as once the first few turns of screw 4 and coil 1 are in the substrate, the coil will be pulled in and the threads 10 of the substrate 9 will guide the following and proximal parts of the coil and screw.

The means illustrated in FIGS. 10, 11, 12, 13, 14, 15 and 16 for detaching the attachments between the screw 4 and the coil 1 is the final turns of the screw, described above after the screw 4 is prevented from advancing into the lumen of the substrate 9 by the head of the screw contacting the substrate 9 and plate 11. This causes the turns 2 of the coil 1 to rotate about the wire axis and pull the turns of the coil at the point of detachable attachment away from the thread 5 of the screw 4. The detachable attachment can be effected by many means well known to the art in addition to the preferred embodiments illustrated. The preferred embodiments on the said FIGS. 10, 11, 12, 13, 14, 15 and 16 illustrate a press fit between a mortise and tendon 16, 17. These examples of mortise and tendon could be discrete connections arranged along a line where the coil 1 and the screw 4 interface, however the preferred embodiment is to have a continuous ridge or tongue and receiving groove that run along the said line and this is one way the drawings should be interpreted. This groove and ridge can easily be fabricated into the spring and screw in the manufacturing process. The detachable attachment is assisted by a bulge 18 that acts as a fulcrum and assist in leveraging the turn of the coil away from the thread to which it is detachably attached. Similar to the exemplar, the mortise and tendon above, the preferred embodiment of the bulge is to have a continuous ridge that runs along the screw or the coil, or both at approximately the location shown for the bulge at 18 in the said FIGS. 10, 11, 12, 13, 14, 15 and 16. This bulge might also be a bulge that is created by a chemical reaction to the environment in which the screw is inserted. For example the adhesive could contain a material that would increase in bulk when exposed to a chemical in the environment that might also be the solute for the adhesive. An example of such a chemical reaction would be iron in the water soluble adhesive and water in the environment. Another example would be swelling or volume change due to water absorption by an appropriate material. These however are only an examples of many other bulking agents that are well known to the art. This frees the turn of the coil to expand and perhaps spring-back. This method of attachment could also be effected by an adhesive, spot welding, friction welding, press welding (cold weld) or other means well known to the art that can be detachably attachable. A bead of adhesive or a line of spot welds or continuous welds or pressure welds could be located along the same line that the mortise and tendon 16 and 17 run as illustrated in FIGS. 10, 11, 12, 13, 14, 15 and 16 or such other convenient location for the purpose. The inclusion of the bulge 18 in the preferred embodiment would be helpful for most methods that require detachable attachment to ensure separation when desired. It should also be noted that because of spring-back 12 and the tendency of the turn of the coil 1 to move away 15 from the screw 4 the chances of reattachment is very low. In the cases where adhesives or spot welds, or pressure welds are used to effect the bond, there is no reasonable chance that reattachment will occur. These methods of detachably attaching the coil 1 and the screw 4 are applicable in similar manner to those preferred embodiments illustrated on FIGS. 17, 18, 19, and other embodiments that are within the ambit of this invention.

Figures 10, 11:
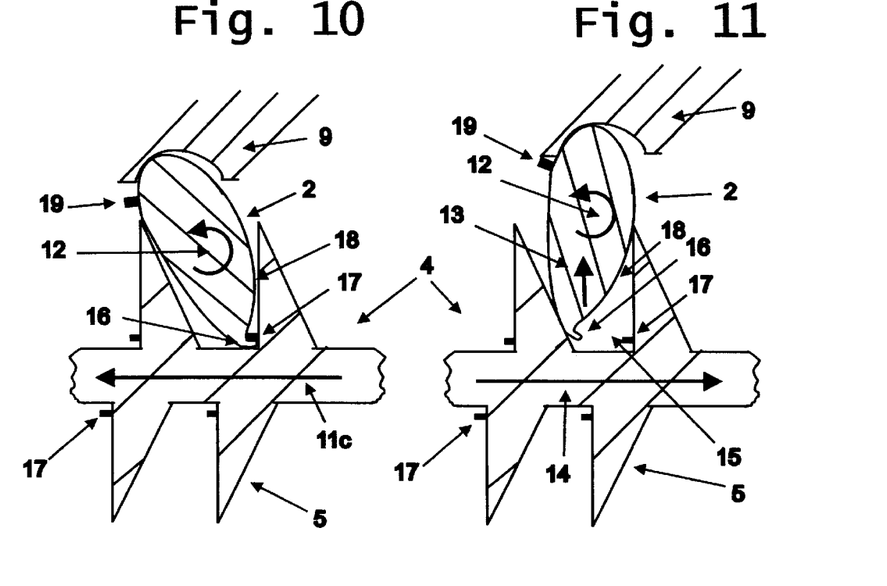
FIG. 10 and FIG. 11 are cross-sectional views illustrating one preferred embodiment of the invention, a method of loading the coil 1 onto the screw 4 to prevent it from expanding prior to being inserted into the hole of the substrate 9. Also illustrated is a stop 19 which is included on some preferred embodiments which stops the coil from being over torqued by the operator, or at least signals the operator or a sensing device that the torquing limit has been reached. The drawing is a detail of the cross-sectional shape illustrated in FIGS. 5, 6 and 7.
Figures 12, 13:
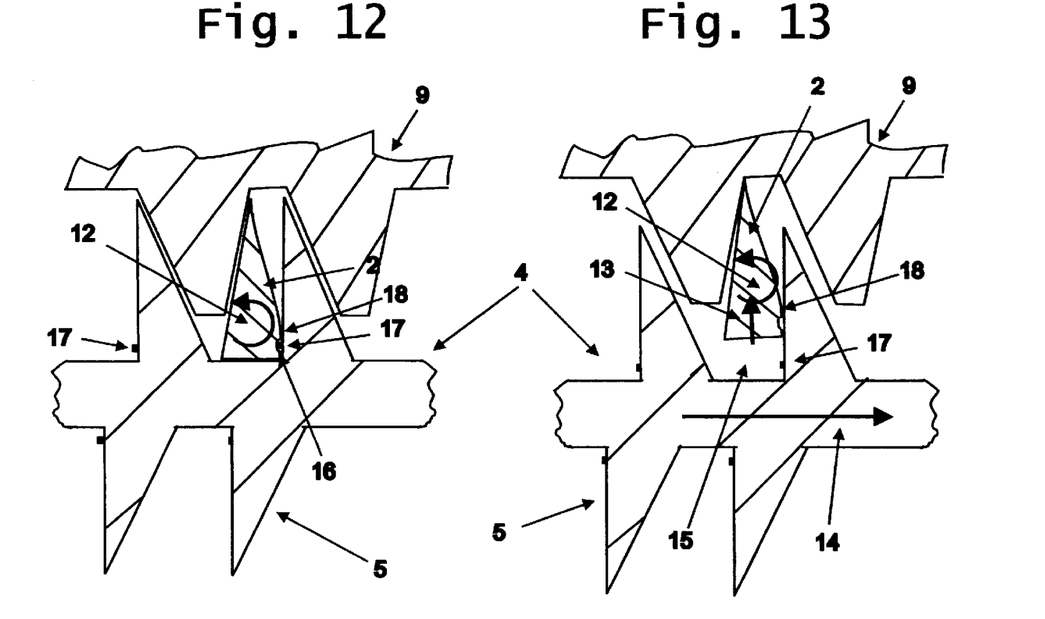
FIG. 12 and FIG. 13 are cross-sectional views illustrating one preferred embodiment of the invention, a method of loading the coil 1 onto the screw 4 to prevent it from expanding prior to being inserted into the hole of the substrate 9. The drawing is a detail of the cross-sectional shape illustrated in FIGS. 8 and 9.

FIG. 10 and FIG. 11 also illustrate a stop 19 that stops the rotation of the screw when the coil turns 2 have been sufficiently torqued or tipped but at least signals (by the resistance to turning the screw) the operator that the limit of torquing the turns 2 of the coil 1 have been reached. As the screw 4 is turned into the substrate 9 by the operator the turn of the coil 1 is torqued or by being drawn toward the head of the screw. To prevent over rotation of the screw 4 which would over-torque the turns 2 of the coil 1 and perhaps cause them to unwind, a stop 19 is positioned on the turn 2 of the coil 1 so that it contact with the substrate 9 and prevents further screw rotation and consequent, further torquing of turns 2. This feature is not required on all preferred embodiments of the invention, such as those illustrated on FIGS. 12 and 13. This stop 19 can be placed at different locations of the coil, but for most preferred embodiments it will be incorporated as a continuous ridge into the coil when it is formed into a spring.

Figure 14:
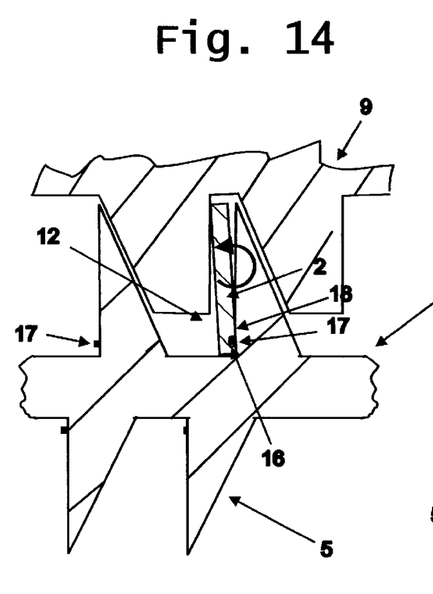
FIGS. 14 and 15 are cross-sectional views illustrating on preferred embodiment of the invention, a method of loading the coil 1 onto the screw 4 to prevent it from expanding prior to being inserted into the hole of the substrate 9. The drawing also illustrates a coil with a rectangular cross-section.
Figure 15:
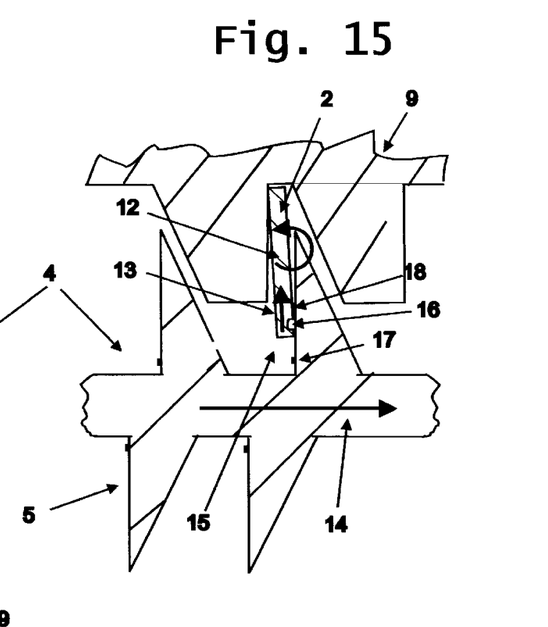

FIGS. 14 and 15 illustrate another cross-sectional shape for the turns 2 of Coil 1, that being a rectangle. The rectangular shape of the turns 2 of the coil 1 together with the meshing and matching shape of the thread 10 of substrate 9 has the advantage of maintaining the position of the screw 4, along its longitudinal axis, relative to the lumen of the substrate 9 as the coil expands and follows the receding substrate. Otherwise the system is the same as that illustrated for coils 1 having cam and triangular cross-sections.

Figure 16:
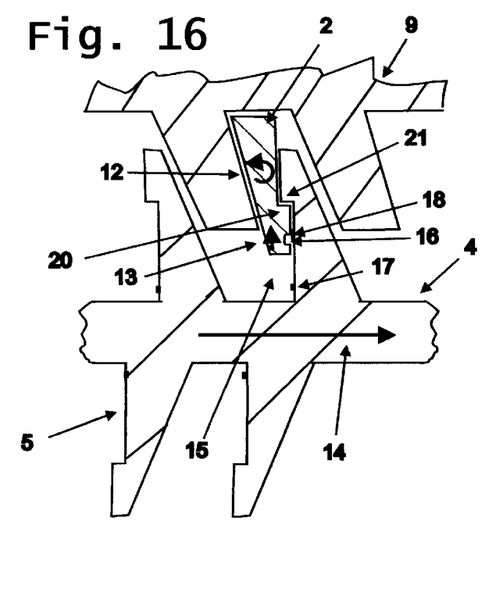
FIG. 16 illustrates a coil 1 having a wedge shaped cross-section, roughly opposite in aspect to the triangular cross-section illustrated in FIGS. 8 and 9. The purpose being to force the screw farther into the substrate for certain types of substrate recession.

FIG. 16 illustrates another preferred embodiment of the invention that utilizes a coil 1 that has a notched wedge shaped turn 2 cross-section such that as the substrate and coil separate, the sliding interface between the two forces the screw further into the substrate, thereby tightening the screw in the substrate. This arrangement also assists in centering the screw in the lumen of the substrate when recession occurs. The shape is of course only an example of the principal and other shapes with corresponding profiles for the screw, coil and the tap shape for preparing the substrate all can very depending upon the circumstances. The notch 20 in the cross-section of the turn 2 of coil 4 acts as a stop when contacting the corresponding notch 21 in the thread 5 of the screw 4. This acts to limit the upward action of the thread and maintains the proper alignment with the substrate. This feature could of course be incorporated into other cross-sectional threads of preferred embodiments of the invention and would be particularly useful in the approximately triangular and rectangular cross-sections.

Figure 17:
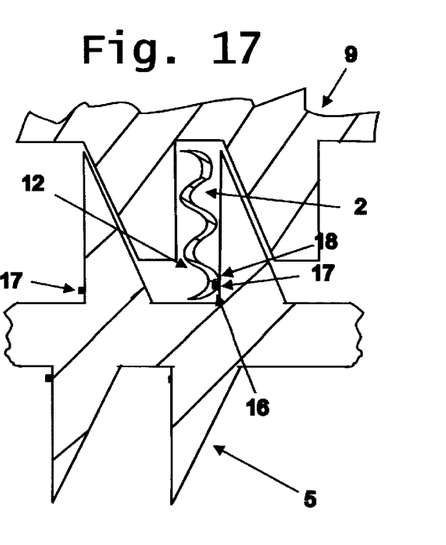
FIG. 17 illustrates a coil 1 having a corrugated cross-section.

FIG. 17 illustrates a corrugated coil that can act in a similar manner as the torqued or tilted coil and can be prepared and attached to the preferred embodiments in a similar manner for similar purposes. FIG. 17 provides a top down view of the corrugated coil. As mentioned earlier the corrugations can be impressed on the coil at any angle. FIG. 17 illustrates only one of the possible angles, that being one that has ridges that run parallel to the turns of the coil. That is, if one examined only one turn of the coil, laid it flat on a surface so that it would resemble a flat or more correctly a split spring washer, the corrugations would appear to be concentric rings or circles from the center hole of the coil to the larger ring defining the outside diameter. Looking at the same single turn, flat on a surface the corrugations could radiate from the center hole to the outside diameter or any angle between the two or equivalent pattern. One can appreciate that if the coil is flat in its loaded configuration and is detachably attached to the screw in like manner as the tilted or torqued coil, then when the constraints maintaining the loading are removed, the flat turns forming the coil will spring-back and then act to pull the screw 4 further into the lumen of the substrate 9 and also increase the friction between the screw and the coil. Likewise the corrugated coil can be made of shape memory metal alloy (SMA) material and as previously explained can change from its flat martensitic form to its corrugated austenitic form by shape recovery when heated from a temperature equal to or below its martensite finish temperature to a temperature equal to or greater than its austenite finish temperature. When this occurs, if the coil has been placed on a screw in similar manner to the rectangular cross-sectioned coil as illustrated in FIGS. 14 and 15, it will upon shape recovery tend to pull the screw 4 further into the lumen of the substrate 9 and increase the friction between the screw 4 and the coil 1, both of which will assist in maintaining the hold and purchase of the screw and coil in the lumen of the substrate.

Figures 18, 19:
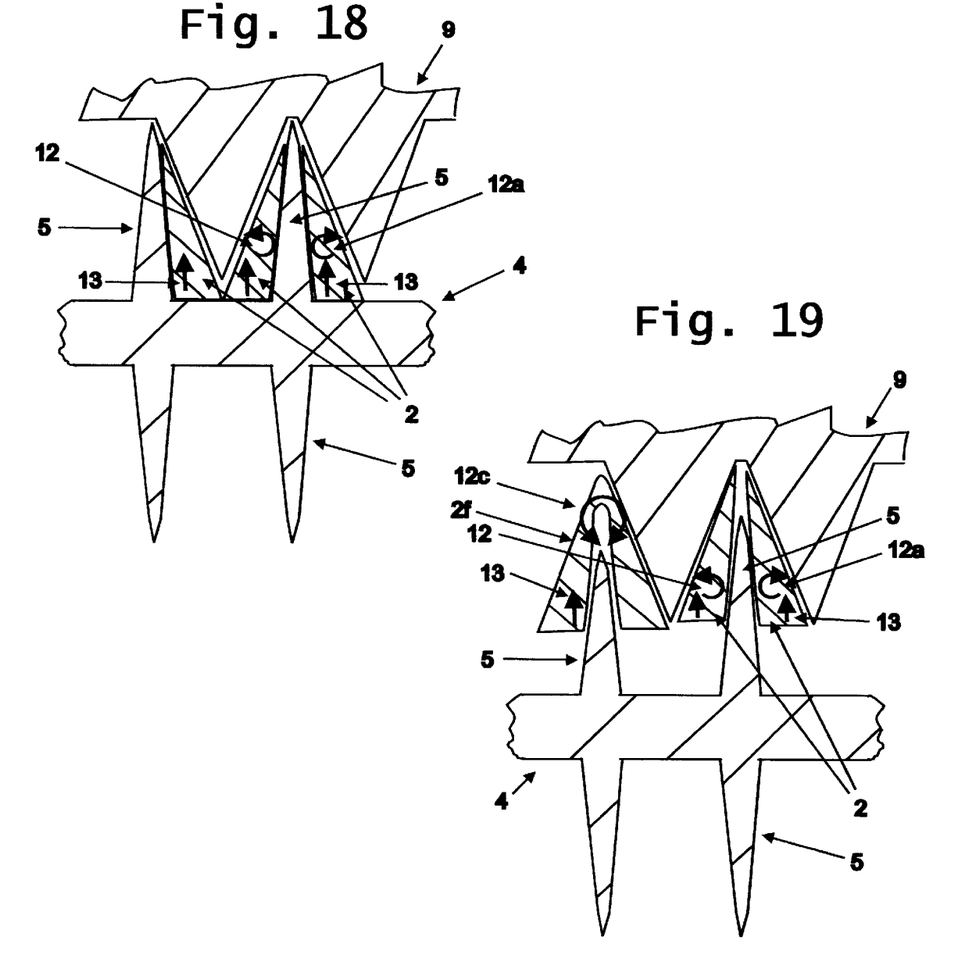
FIGS. 18 and 19 illustrate a preferred embodiment of the invention having a double interlacing coil with approximately triangular cross-sections.

FIGS. 18 and 19 illustrate a double coil 1 that is interleaved so that each interfaces with one side of a thread 5. The detachable attachments joining the coils 1 to the threads 5 and the screw 4 can be similar to those described for the preferred embodiments illustrated in FIGS. 14 and 15, that is they can be chemical or mechanical bonds of various types. A preferred embodiment might for example be an adhesive that is soluble in water or other solvent, or biodegradable adhesive applied to all or a part of the interface between the coils 1 and the thread 5 or the rest of the screw 4, or both. The advantage of this preferred embodiment is that the alignment between the substrate 9 and screw 4 will be approximately maintained. The coils 1 may both be torqued or tilted by the methods hereinbefore described, so that they spring back 12 and 12a away from the thread 5 of the screw 4. However it may be preferable to only have one of them spring back, or have them spring back in other directions. For example, it might be preferable to have one coil spring back 12 but not have the other coil spring back 12a. This would ensure that the screw in this illustration is biased to move from left to right or further into the substrate 9 to maintain tightness. The choice of applying torque or tilt to the coils by the methods hereinbefore described to obtain the required spring-backs will depend upon the material into which the screw 4 and coils 1 are inserted. One or both coils may be treated by those methods hereinbefore described so that they move radially away 13 from the screw 4 and follow the receding substrate 9 as illustrated on FIG. 19. Although FIGS. 18 and 19 illustrate two coils, one on each side of the threads 5 of the screw 4, one preferred embodiment is to use a single coil that has a "U" shaped cross-section also illustrated on FIG. 19 that would wrap around the thread 5 of the screw 4. In this example the screw thread 5 would necessarily be somewhat shorter to accommodate the turn of the coil 2f wrapping around its apex. The apex of the turn 2f could be flexible to allow the coil to spring back 12c as required resulting from the appropriate torquing or tilting treatment hereinbefore described. A preferred embodiment of this "U" shaped coil a turn of which 2f is illustrated on FIG. 19 follows the substrate 9 away 13 from the screw 4 as the said substrate recedes and the coil 2f unloads or springs back 12c to maintain contact between the turn 2f of the coil and the thread 5. Depending upon the material into which the screw was inserted, turn 2f could of course have different torquing or tilting treatments as hereinbefore described to create different spring-back schemes.

Figure 20:
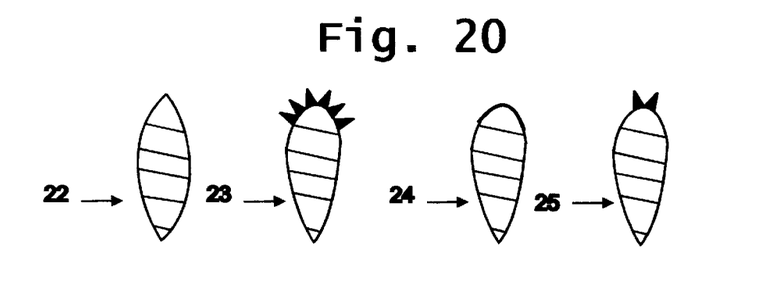
FIG. 20 illustrates four of the many shapes that different preferred embodiments of the invention may have to ensure a secure purchase between the coil 1 and the substrate 9.

FIG. 20 illustrates four of the many shapes of the part cross-sectional shape 22, 23, 24, and 25 of the coil 1 that different preferred embodiments of the invention may have to ensure a secure purchase between the coil 1 and the substrate 9. Coil cross-section 25 is intended to illustrate a porous surface treatment on the area of the coil that contacts the surface of the substrate 9. Such surface treatments are well known to the art and provide a surface onto and into which the bone can grow and incorporate. Other surface treatments may be added at this location where the surface of the coil comes in contact with the substrate 9 at 10, for various purposes, whether to promote adhesion or in the case of applying a Teflon™ like material to enhance lubrication. These surface treatments may of course be applied to other shapes utilized for the coil.

Figure 21:
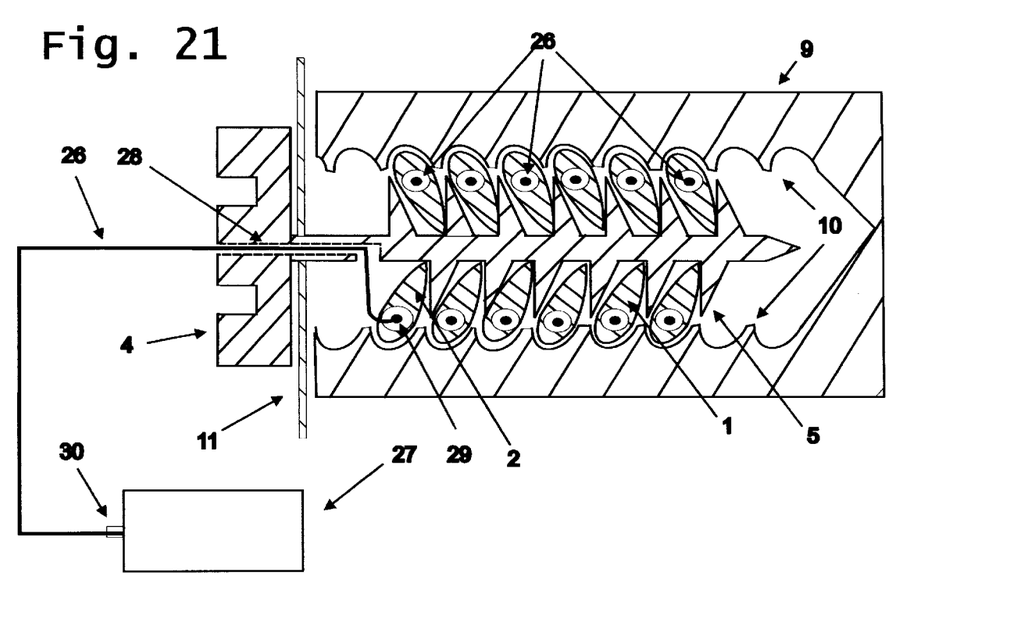
FIG. 21 is a method of heating the coil made of shape memory alloy (SMA) above its austenitic finish temperature to effect shape recovery and impart to the coil spring and perhaps torque. The heating method consists of an optical fibre 26 delivering photothermal energy from a laser 30 to the turns 2 of the coil 1.

FIG. 21 illustrates a method of heating the coil 1 above the austenitic finish temperature to effect shape recovery and thereby recover the springiness and expanded shape of the coil, and perhaps the torque or tilt of the coil as well. Preferred embodiments of the invention would include heating means, as described in U.S. Pat. No. 5,846,247 by Unsworth and Waram which patent is incorporated herein by specific reference. This patent teaches a method whereby an optical fiber delivers photo-thermal energy into the lumen of a tube made of shape memory alloy (SMA) material to effect shape recovery. A preferred embodiment of this present invention uses this method to heat the turns of the coil to effect shape recovery and the radial expansion of the coil and perhaps rotation of the coil turns about the wire axis, and torquing action of the turns. FIG. 21 includes an optical fiber 26 that delivers photo-thermal energy produced by a laser 27, that passes through a lumen 28 in the screw 4 and thence into a lumen 29 of a turn 2 of the coil 1. The optical fiber 26 passes through some or all of the turns 2 of the coil 1. When the coil and screw assembly are in place in the lumen of the substrate 9, the photo-thermal energy applied heats up the coils and the shape that has been set in at high temperature is recovered as the shape memory alloy (SMA) material is heated from a temperature equal to or below the martensite finish temperature to a temperature equal to or above the austenite finish temperature. The shape recovered is in this case the radially expanded coil and perhaps torqued turns 2 of coil 1. The delivery of photo-thermal energy to the coils may involve removing the optical fiber 26 from the lumen of the coil as photo-thermal heat is delivered to the distal end of the optical fiber. If a leaky fiber is utilized, that leaks photothermal energy out the sides of that part of the optical that is inside the lumen of the coil that is to be heated, then it is not necessary to withdraw the optical fiber from the lumen of the coil to heat the coil 1. While the drawing shows only one optical fiber, some procedures requiring heating along long lengths of a coil might require a number of optical fibers. Once the coil is heated and the shape recovered, the optical fiber can either be withdrawn or severed at the screw head prior to turning the screw sufficiently to break the bond between the coil and the screw. The rotating connector 30 assures that the optical fiber is not twisted during the insertion of the coil and screw and prior to tightening the screw when the coil remains stationary.

The photo-thermal energy supplied as illustrated in FIG. 21 can also be applied to a coil 1 that is made of shape memory alloy (SMA) material either after initial heating from the martensitic phase, as described above, or after it is or has already become austenitic, in which case the purpose of doing so would be to impart on the coil additional stiffness. This then could be applied to a coil that was superlastic and that has not been through a shape recovery step as well as one that has. This variable stiffness of the austenitic coil which varies with the temperature to which the coil is heated, can be made steady or pulsed in response to a steady supply of photo-thermal energy or pulsed supply of photo-thermal energy. Also, when the heat is reduced, this stiffness is also ratably reduced. For example, this feature allows one to vary the lash between the coil and the screw, the torquing and tilting forces, the friction between the coil, screw and substrate or the expansion of the coil.

This preferred embodiment of the invention is not the only method of heating the coil, once it is inside the substrate. It is also possible to rely on the heat of the substrate itself if the temperature of the substrate is equal to or above the austenite finish temperature of the shape memory alloy (SMA) material and does not go below the martensite start temperature of the shape memory alloy (SMA) material (which would cause the coil to loose its strength and shape). In order to prevent premature activation of the coil, the temperature of the substrate could be lowered temporarily to below the austenite start temperature of the shape memory alloy (SMA) material, during the installation of the screw and coil into the substrate lumen, and then subsequently raised by active or passive means to or above the austenite finish temperature, once the screw and coil are properly positioned within the substrate lumen. In the case where the shape memory alloy (SMA) material has an austenite start temperature, or possibly in some situations an austenite finish temperature, equal or below the ambient temperature of the shipping, storage, and installation environments, the coil could be cooled by some means such as refrigeration or submersion in liquid nitrogen, or packed in dry ice, after being manufactured and prior to installation. In the case of orthopedic use this method would be most often used where the austenite start temperature, or in some situations the austenite finish temperature, of the shape memory alloy (SMA) material is equal to or below body temperature.

It should also be noted that for simplicity of illustration, the screws and coils are not shown as being tapered at their distal tips, but this would normally be the case for most applications and does not in any way alter the principal characteristics of the preferred embodiments herein described.

While the description of the preferred embodiments combines the features that give rise to the torquing action by tilting the turns 2 of the screw 4, in addition to the features that cause the coil 1 to expand, it is understood that certain embodiments of this invention may comprise both of these features together or only one of them.

While the description of the coil includes a solid or hollow tube, it should be understood that the coils can be composed of a multiplicity of wires or tubes or both, woven or intertwined in addition to any composite material. It should also be understood that a multiplicity of coils can be used rather than one. These coils could be intertwined for example in the form of a double or triple helix.

While the description speaks of a screw, it is to be understood that the member could include any fastening device that has a thread that can mesh with a coil, for example a lag bolt, or bolt and nut or threaded substrate. The coil could for example be detachably attached to a substrate, as described in the preferred embodiments above described, and the screw could then screw into the substrate and coil assembly; that is this preferred embodiment could be just the reverse of the preferred embodiments described above.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the inventions and appended claims.

What is claimed is:

1. An expandable fastener assembly for insertion into a substrate, comprising:
   (a) a threaded fastener having a proximal end and a distal end, the proximal end being provided with a head having turning means, the fastener having a shank extending from the head to the distal end along a longitudinal axis, the shank being provided with a helical thread extending radially outwardly from the shank, said thread having a first surface generally facing the distal end and a second surface generally facing the proximal end;
   (b) a continuous, expandable helical coil member wound around the shank of the threaded fastener, the coil member having a radially inwardly facing portion and a radially outwardly facing portion with a thread-contacting surface extending between the inwardly and outwardly facing portions and generally facing the distal end of the fastener wherein, prior to insertion of the fastener assembly into the substrate, the coil member is in a radially compressed form; and
   (c) releasable securing means by which the coil member is releasably secured in its radially compressed form, along at least a portion of its length, to the shank of the fastener, wherein the releasable securing means maintains the connection between the coil member and the fastener, thereby maintaining the coil member in its radially compressed form at least until the fastener assembly is completely or substantially completely threaded into the substrate.

2. The fastener assembly of claim 1, wherein the coil member is permanently connected to the shank of the fastener at the distal end thereof.

3. The fastener assembly of claim 1, wherein the releasable securing means is selected from the group comprising adhesives, welds or mechanical connections between the coil member and the fastener.

4. The fastener assembly of claim 1, wherein radial expansion of the coil member causes radial biasing of the radially outwardly facing portion of the coil member against the substrate, while the radially inwardly facing portion remains meshed with the threads of the fastener.

5. The fastener assembly of claim 1, wherein the thread-contacting surface of the coil member comprises a radially inward portion and a radially outward portion with a pivot axis therebetween, the releasable securing means releasably connecting the radially inward portion of the thread-contacting surface to the second surface of the thread along at least a portion of the coil member, the pivot axis being tangential to the coil member.

6. The fastener assembly of claim 5, wherein the twisting of the coil member about the pivot axis causes rotation of the radially inward portion of the thread-contacting surface away from the second surface of the thread, overcoming the connection provided by the releasable securing means.

7. The fastener assembly of claim 6, wherein the releasable securing means comprises a ridge provided in the second surface of the thread which mates with a groove provided in the radially inward portion of the thread-contacting surface of the coil member.

8. The fastener assembly of claim 5, wherein said twisting of the coil member results in the radially outward portion of the thread-contacting surface being axially displaced toward the distal end of the fastener, thereby engaging the second surface of the thread and biasing the fastener into the substrate.

9. The fastener assembly of claim 8, wherein the twisting of the coil member is produced during tightening of the fastener in the substrate, whereby tightening draws the fastener axially in the direction of the proximal end, causing the thread to push against the coil member such that a surface of the coil member opposite the thread-contacting surface and radially outwardly of the pivot axis engages the substrate and causes pivoting of the coil member about the pivot axis.

10. The fastener assembly of claim 9, wherein said twisting of the coil member caused by tightening the fastener results in the coil member exerting an axially directed biasing force against the second surface of the thread in a direction toward the distal end of the fastener.

11. The fastener assembly of claim 10, wherein the radially outwardly facing portion of the coil member extends radially outwardly of the thread when the coil member is in its radially compressed form.

12. The fastener assembly of claim 10, wherein the cross-sectional shape of the coil member is cam-like with the radially outwardly facing portion forming a cam lobe, triangular, diamond-shaped or rectangular.

13. The fastener assembly of claim 1, wherein the coil member comprises a plurality of segments releasably connected together end-to-end.

14. The fastener assembly of claim 3, wherein the securing means is an adhesive which is water-soluble, soluble to some other solute or biodegradable.

15. The fastener assembly of claim 8, wherein the coil member is comprised of a shape memory alloy in which a martensitic state of the alloy corresponds to the radially compressed form of the coil member and the austenitic state of the alloy corresponds to the radially expanded form of the coil, and wherein said shape memory alloy is transformed from the martensitic state to the austenitic state after the fastener is inserted into the substrate.

16. The fastener assembly of claim 15, wherein the coil member has a hollow tubular cross-section or a corrugated cross-sectional shape which is deformed when the fastener is tightened, and which shape is recovered when the shape memory alloy is transformed from the martensitic to the austenitic state.

17. The fastener assembly of claim 5, wherein a bulge is provided in the thread-contacting surface of the coil member proximate the pivot axis, the bulge acting as a fulcrum.

18. The fastener assembly of claim 1, wherein the coil member comprises two interleaving coils, a first coil of which engages the first surface of the thread, and a second coil of which engages the second surface of the coil.

19. The fastener assembly of claim 1, wherein the coil member has an approximately U-shaped cross-section and extends about the first and second surfaces of the thread.

20. The fastener assembly of claim 1, wherein the substrate is bone tissue, and wherein a porous surface is provided on the radially outward facing portion of the coil member to promote bone growth.

21. The fastener assembly of claim 1, wherein the coil member is hollow and has a lumen which is open at its proximal end, the coil member comprising a shape memory alloy which is martensitic at an ambient temperature of the substrate, and wherein an optical fiber extends into the lumen through the proximal end to deliver sufficient photothermal energy to an interior of the lumen to heat the shape memory alloy to a temperature at which it becomes austenitic, and wherein a martensitic state of the alloy corresponds to the radially compressed form of the coil member and the austenitic state of the alloy corresponds to the radially expanded form of the coil.

22. The fastener assembly of claim 1, wherein the coil member is hollow and has a lumen which is open at its proximal end, the coil member comprising a shape memory alloy which is austenitic or superlastic, and wherein an optical fiber extends into the lumen through the proximal end to deliver and vary the amount of additional photothermal energy delivered to an interior of the lumen to heat the shape memory alloy to vary the stiffness of the coil approximately in proportion to the temperature of the coil.

23. A fastener assembly for insertion into a substrate, comprising:
   (a) a threaded fastener having a proximal end and a distal end, the proximal end being provided with a head having turning means, the fastener having a shank extending from the head to the distal end along a longitudinal axis, the shank being provided with a helical thread extending radially outwardly from the shank, said thread having a first surface generally facing the distal end and a second surface generally facing the proximal end;
   (b) a continuous helical coil member wound around the shank of the threaded fastener, the coil member having a radially inwardly facing portion and a radially outwardly facing portion with a thread contacting surface extending between the inwardly and outwardly facing portions and generally facing the distal end of the fastener;

wherein the thread-contacting surface of the coil member comprises a radially inward portion and a radially outward portion with a pivot axis therebetween, the radially inward portion of the thread-contacting surface engaging the second surface of the thread prior to insertion of the fastener into the substrate, wherein tightening of the fastener in the substrate causes twisting of the coil member about the pivot axis so as to cause rotation of the radially inward portion of the thread-contacting surface away from the second surface of the thread, and said twisting of the coil member results in the radially outward portion of the thread-contacting surface being axially displaced toward the distal end of the fastener, thereby engaging the second surface of the thread and biasing the fastener into the substrate;

said helical coil member being formed from a shape memory alloy having been shape set at high temperature to have a first coil shape with a lumen diameter greater than an outer diameter of the shank of the threaded fastener and less than an outer diameter of the helical thread of the threaded fastener, said coil member having being cooled to a temperature below a martensite finish temperature of said shape memory alloy and being shaped into a second coil shape having a lumen diameter less than said outer diameter of said helical thread and greater than said outer diameter of said shank.

24. The fastener assembly of claim 23, wherein the twisting of the coil member is produced during tightening of the fastener in the substrate, whereby tightening draws the fastener axially in the direction of the proximal end, causing the thread to push against the coil member such that a surface of the coil member opposite the thread-contacting surface and radially outwardly of the pivot axis engages the substrate and causes pivoting of the coil member about the pivot axis.

25. The fastener assembly of claim 24, wherein said twisting of the coil member caused by tightening the fastener results in the coil member exerting an axially directed biasing force against the second surface of the thread in a direction toward the distal end of the fastener.

26. The fastener assembly of claim 23, wherein said second coil shape is imparted to said coil member by tightly winding the coil member around the screw after the coil member has been cooled to below the martensite finish temperature.

27. The fastener assembly of claim 23, wherein radial expansion of the coil member causes radial biasing of the radially outwardly facing portion of the coil member against the substrate, while the radially inwardly facing portion remains meshed with the helical thread of the fastener.

28. The fastener assembly of claim 23, wherein a cross-sectional shape of the coil member is cam-like with the radially outwardly facing portion forming a cam lobe, triangular, diamond-shaped or rectangular.

29. The fastener assembly of claim 23, wherein the coil member comprises a plurality of segments releasably connected together end-to-end.

30. The fastener assembly of claim 23, wherein the coil member has a hollow tubular cross-section or a corrugated cross-section which is deformed when the fastener is tightened, and which shape is recovered when the shape memory alloy is transformed from its martensitic state to its austenitic state.

31. The fastener assembly of claim 23, wherein the coil member comprises two interleaving coils, a first coil of which engages the first surface of the helical thread, and a second coil of which engages the second surface of the coil member.

32. The fastener assembly of claim 23, wherein the coil member has an approximately U-shaped cross-section and extends about the first and second surfaces of the thread.

33. The fastener assembly of claim 23, wherein the substrate is bone tissue, and wherein a porous surface is provided on the radially outward facing portion of the coil member to promote bone growth.

34. The fastener assembly of claim 23, wherein the second coil shape of the coil member is flattened relative to the first coil shape such that the coil member is constrained in its flattened form at temperatures at or below the martensite finish temperature, and such that when the coil member is subsequently heated to or above its martensite finish temperature, tilt will be imparted to turns of the coil such that the threaded fastener will become biased forwardly into the substrate.

35. A fastener assembly for insertion into a substrate, comprising:
   (a) a threaded fastener having a proximal end and a distal end, the proximal end being provided with a head having turning means, the fastener having a shank extending from the head to the distal end along a longitudinal axis, the shank being provided with a helical thread extending radially outwardly from the shank, said thread having a first surface generally facing the distal end and a second surface generally facing the proximal end;
   (b) a continuous helical coil member wound around the shank of the threaded fastener, the coil member having a radially inwardly facing portion and a radially outwardly facing portion with a thread contacting surface extending between the inwardly and outwardly facing portions and generally facing the distal end of the fastener;
   wherein the thread-contacting surface of the coil member comprises a radially inward portion and a radially outward portion with a pivot axis therebetween, the radially inward portion of the thread-contacting surface engaging the second surface of the thread prior to insertion of the fastener into the substrate, wherein tightening of the fastener in the substrate causes twisting of the coil member about the pivot axis so as to cause rotation of the radially inward portion of the thread-contacting surface away from the second surface of the thread, and said twisting of the coil member results in the radially outward portion of the thread-contacting surface being axially displaced toward the distal end of the fastener, thereby engaging the second surface of the thread and biasing the fastener into the substrate;
   said helical coil member formed from a superlastic material comprising a nitinol shape memory alloy having been shape set at high temperature to have a first coil shape with a lumen diameter greater than an outer diameter of the shank of the threaded fastener and less than an outer diameter of the helical thread of the threaded fastener, and then shaped into a second coil shape having a lumen diameter less than said outer diameter of said helical thread and greater than said outer diameter of said shank, the shape memory alloy being above its austenite finish temperature when the coil member has the first coil shape and the second coil shape.

36. The fastener assembly of claim 35, wherein twisting of the coil member is produced during tightening of the fastener in the substrate, whereby tightening draws the fastener axially in the direction of the proximal end, causing the thread to push against the coil member such that a surface of the coil member opposite the thread-contacting surface and radially outwardly of the pivot axis engages the substrate and causes pivoting of the coil member about the pivot axis.

37. The fastener assembly of claim 36, wherein said twisting of the coil member caused by tightening the fastener results in the coil member exerting an axially directed biasing force against the second surface of the thread in a direction toward the distal end of the fastener.

38. The fastener assembly of claim 35, wherein said second coil shape is imparted to said coil member by tightly winding the coil member around the screw.

39. The fastener assembly of claim 35, wherein radial expansion of the coil member causes radial biasing of the radially outwardly facing portion of the coil member against the substrate, while the radially inwardly facing portion remains meshed with the helical thread of the fastener.

40. The fastener assembly of claim 35, wherein a cross-sectional shape of the coil member is cam-like with the radially outwardly facing portion forming a cam lobe, triangular, diamond-shaped or rectangular.

41. The fastener assembly of claim 35, wherein the coil member comprises a plurality of segments releasably connected together end-to-end.

42. The fastener assembly of claim 35, wherein the coil member comprises two interleaving coils, a first coil of which engages the first surface of the helical thread, and a second coil of which engages the second surface of the coil member.

43. The fastener assembly of claim 35, wherein the coil member has an approximately U-shaped cross-section and extends about the first and second surfaces of the thread.

44. The fastener assembly of claim 35, wherein the substrate is bone tissue, and wherein a porous surface is provided on the radially outward facing portion of the coil member to promote bone growth.

* * * * *